(No Model.) 3 Sheets—Sheet 1.
T. A. STRATTON.
TREE PLANTING MACHINE.

No. 398,754. Patented Feb. 26, 1889.

Witnesses
Thomas A. Stratton, Inventor.
By his Attorney
Franklin H. Hough (No Model.) 3 Sheets—Sheet 3.

T. A. STRATTON.
TREE PLANTING MACHINE.

No. 398,754. Patented Feb. 26, 1889.

Witnesses

Inventor
Thomas A. Stratton
By his Attorney
Franklin H. Hough

UNITED STATES PATENT OFFICE.

THOMAS A. STRATTON, OF LINCOLN, NEBRASKA.

TREE-PLANTING MACHINE.

SPECIFICATION forming part of Letters Patent No. 398,754, dated February 26, 1889.

Application filed June 2, 1888. Serial No. 275,867. (No model.)

*To all whom it may concern:*

Be it known that I, THOMAS A. STRATTON, a citizen of the United States, residing at Lincoln, in the county of Lancaster and State of Nebraska, have invented certain new and useful Improvements in Tree-Planting Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in machines for setting trees and plants; and it has for its object to provide a simple and efficient machine of this character which shall comprise in a single machine mechanism for cutting the soil and opening a furrow, in combination with mechanism adapted to set the trees or plants at regulated and uniform distances apart and at a proper depth within the furrow, and of afterward covering the roots with earth and pressing the same firmly about the tree or plant.

A further object of the invention is to generally improve upon and cheapen the cost of construction, and at the same time render more efficient in operation this class of machinery.

To these ends, and to such others as the invention may pertain, the same consists in the peculiar construction and in the novel combinations, arrangement, and adaptation of parts, all as more fully hereinafter described, shown in the accompanying drawings, and then specifically defined in the appended claims.

The invention is clearly illustrated in the accompanying drawings, which, with the letters of reference marked thereon, form a part of this specification, and in which—

Figure 1:
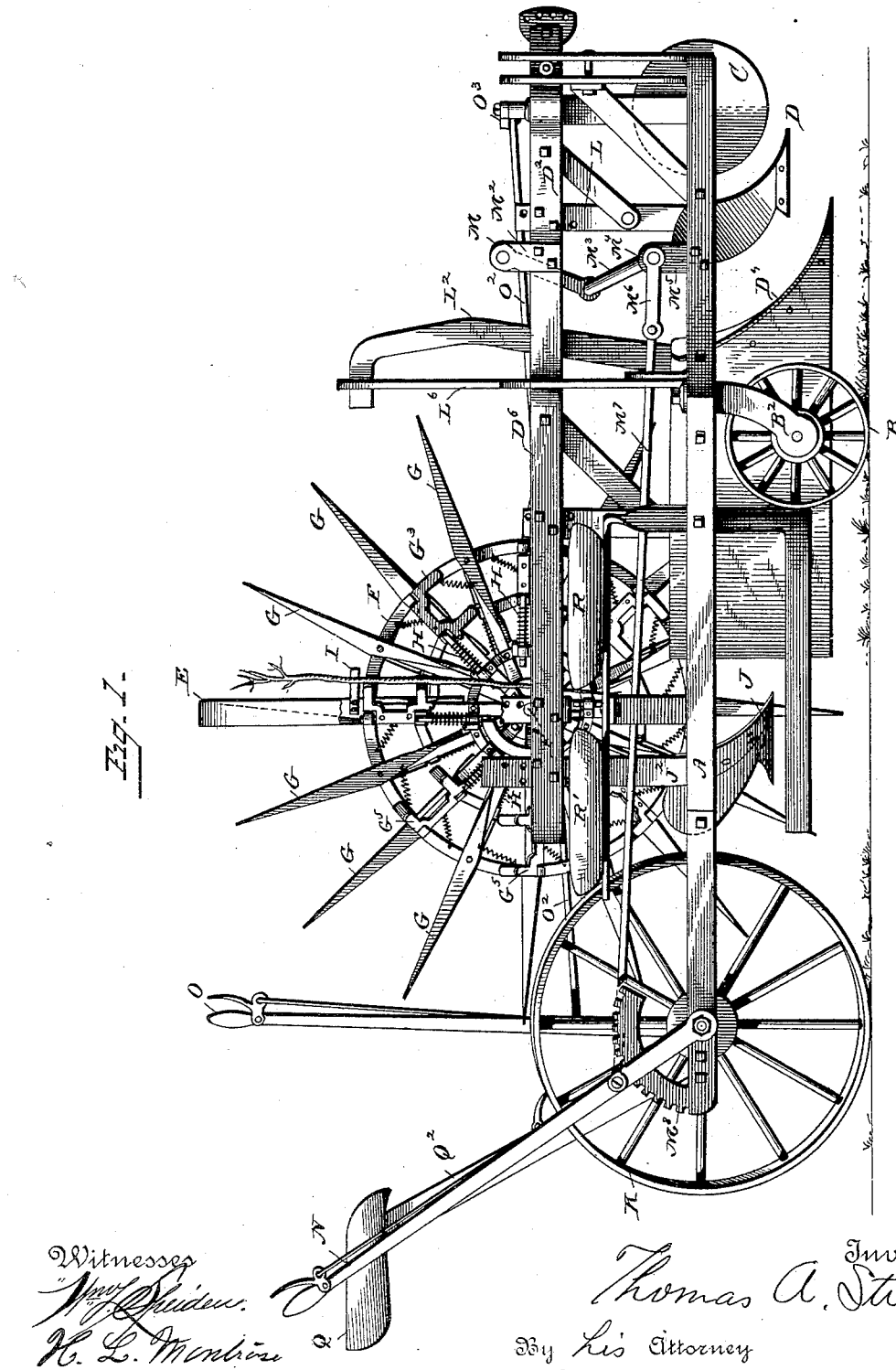
Figure 2:
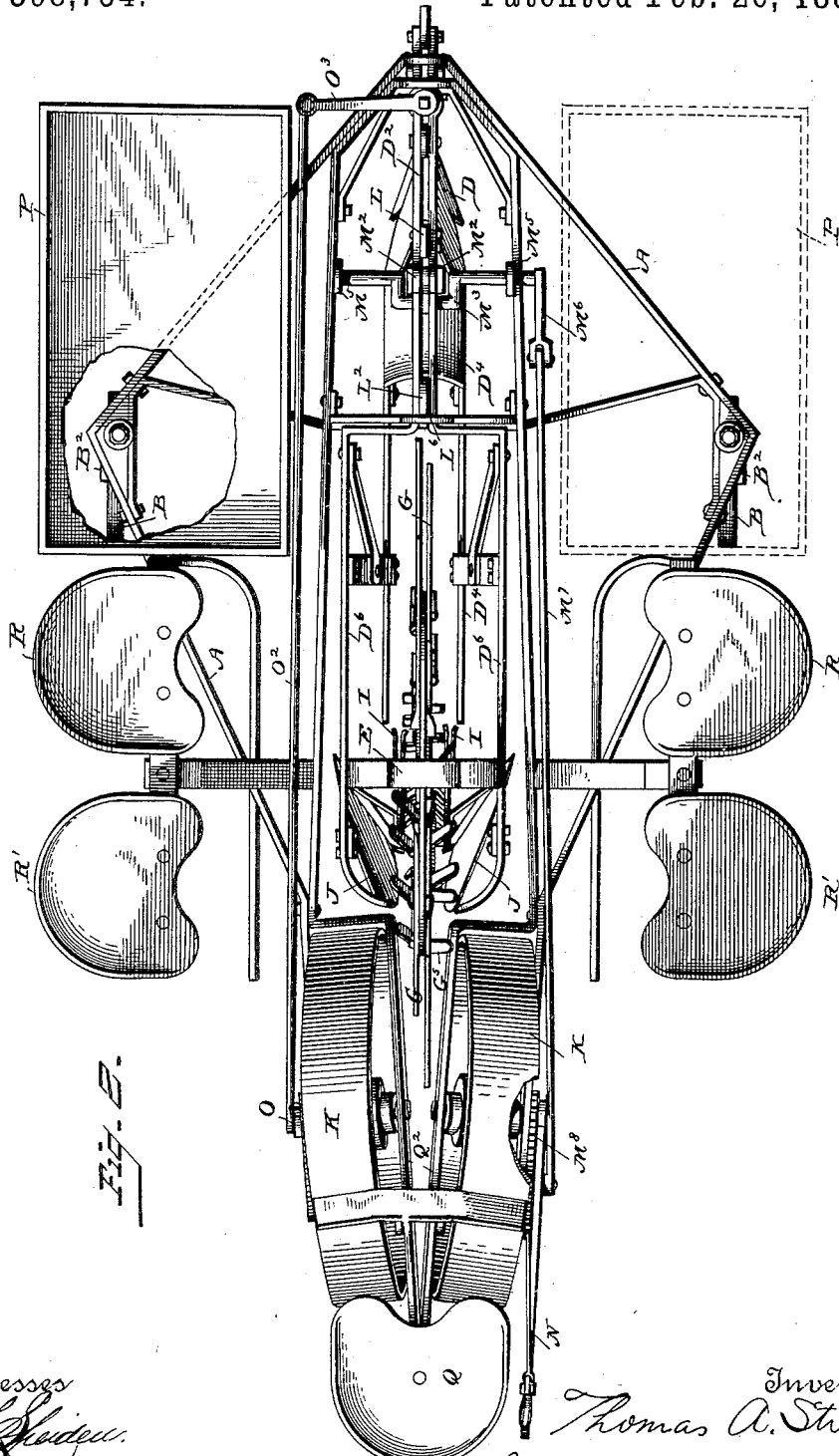
Figure 3:
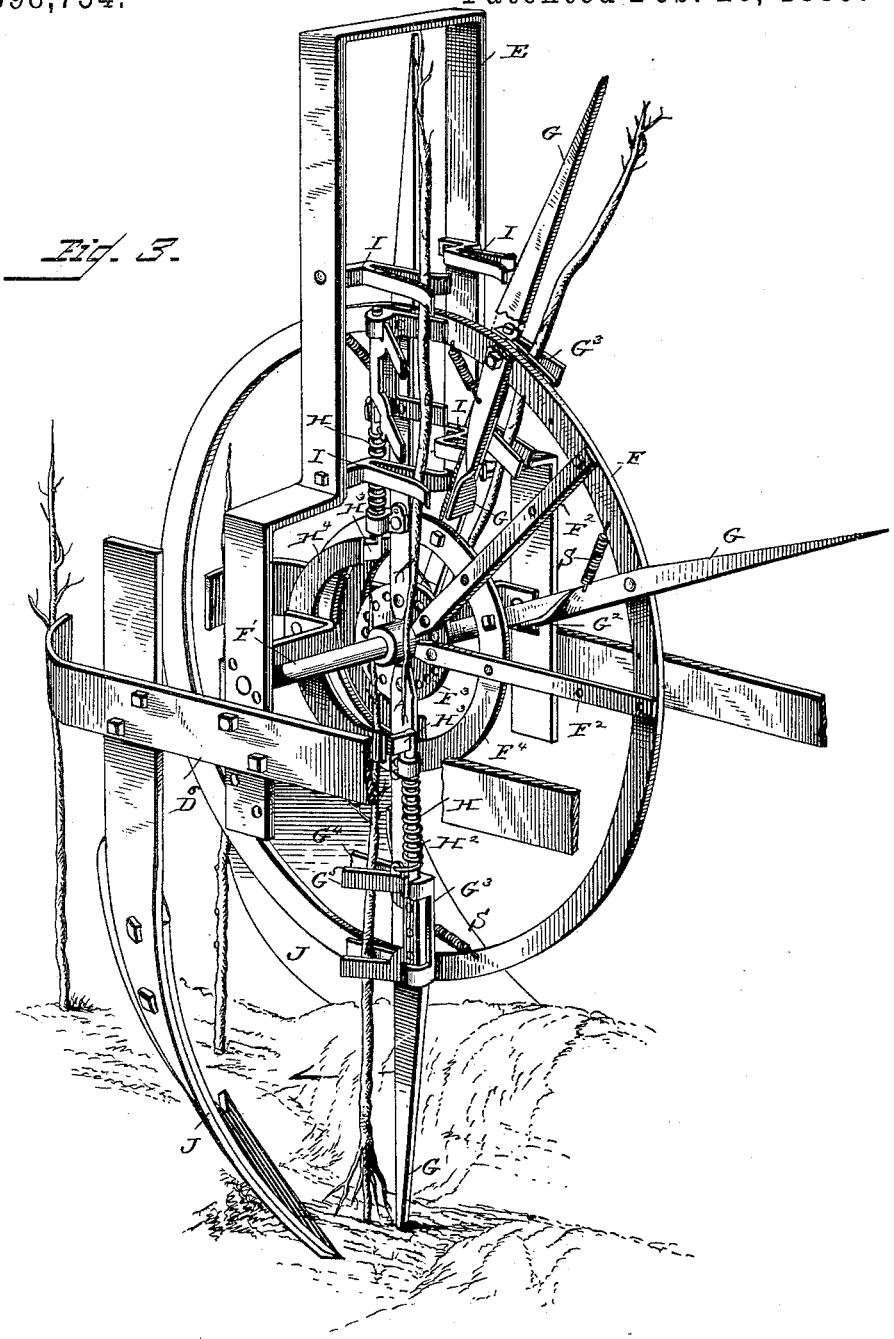

Figure 1 is a side elevation of a tree and plant setting machine constructed in accordance with my invention. Fig. 2 is a plan view of the same. Fig. 3 is a detailed view, upon an enlarged scale, of the walking or palnt-setting wheel, with parts broken away in order to more clearly illustrate the arrangement and operation of the clamping devices.

Reference being had to the details of the drawings by letter, A designates the frame, which may be constructed of either wood or metal, and is supported upon the wheels B B, which are journaled within the depending brackets $B^2$, secured to the outer angles of the frame at the sides of the same, as shown.

C is an adjustable rotary cutter-wheel, which is suitably journaled at the front angle of the frame and serves to cut the soil in advance of the plow D, which is adjustably secured to the bifurcated plow-beam $D^2$.

$D^3$ is a heavy plow or "subsoiler," which is arranged immediately in the rear of the plow D, and which serves to deepen the furrow, and $D^4$ are landsides secured to the beam $D^3$ at the rear of the plow, and which serve to prevent the earth at the sides from falling back into the furrow after the plow has passed. At a short distance to the rear of the point at which the plow is attached the plates or rods $D^5$, which together form the plow-beam $D^2$, are bent outwardly and extended for a short distance toward the opposite sides of the machine, and are again bent at right angles and extended to a point near the rear end of the machine, where their ends are curved inwardly, as shown, thus forming the inner frame, $D^6$.

E is an archway, formed of a strip of metal, the lower ends of which are bolted to the opposite sides of the inner frame, $D^6$, at a point near its rear end, the upper portion of this archway being narrowed.

F is a walking-wheel secured to the transverse shaft F', which shaft is suitably journaled at its ends within the lower portion of the sides of the archway E, immediately above its point of connection with the inner frame. The wheel F is preferably constructed of metal, the metallic strips $F^2$, forming the spokes, being securely bolted at their inner ends to the hub, and at their outer ends to the rim of the wheel. The wheel is greatly strengthened by the addition of an intermediate band of metal, $F^4$, which is bolted to the spokes at a point between the hub and rim.

G G are the legs of the walking-wheel, which are made of flat strips of iron or other metal, and are pivotally connected at a point between their ends to the outer rim of the wheel, each alternate leg being pivoted to opposite sides of the rim at the points at which the outer ends of the spokes are secured. The outer ends of the legs which are extended beyond the circumference of the wheel are sharpened, while at a point near their opposite ends they are twisted, so as to present a flat surface, $G^2$, at right angles to the face of the wheel, and adapted to bear against the front edge of the adjacent spoke of the wheel, as shown.

Secured to the outer face of each of the legs G at a point adjacent to that at which it is pivoted to the rim of the wheel is a clamping device, $G^3$. The fixed jaw $G^4$ of this clamp is bolted securely to the outer face of the leg, while the spring-actuated movable jaw $G^5$ is pivotally connected to the stationary jaw, and is normally held in a closed position by means of a spiral spring, H, which spring is coiled around the extension $H^2$ of the pivot of the movable jaw, said extension being journaled at a point near its outer end to the outer face of the band $F^4$ of the wheel, and provided at its end with a lug or projection, $H^3$, adapted, by reason of its engagement with the cam-surface $H^4$, to turn the pivot and thus open the clamp against the tension of the spring H. The cam $H^4$ is secured at a point adjacent to the rear portion of the wheel, one upon either side of the wheel, as shown, where they serve to open each successive clamp when the leg of the wheel to which it is attached reaches a vertical position at the under side of the wheel, and the clamp will thus be held open until the wheel has made a one-half revolution and the leg assumes a vertical position at the upper point of the wheel. At this point, the lug $H^3$ having passed the cam, the jaw of the clamp is at once closed by the tension of the spring.

I I are bifurcated clamps, constructed preferably of spring metal and secured to the inner faces of the sides of the archway upon either side, with the jaws of the clamps extending toward the front of the machine, as shown.

J is a shovel or coverer secured to the lower end of the standard $J^2$, the upper end of the standard being adjustably secured to the inner frame, $D^2$, at a point near the rear end of the same, and one of these coverers is secured upon each side of the frame, as shown, where they serve the purpose of turning the earth at the sides of the furrow back into the same after the landsides have passed.

K K are heavy wheels provided with broad tires. These wheels are suitably journaled in inclined positions on slanting stub-axles fixed to the rear ends of the frame, and they serve to press the earth back into the furrow and around the sides of the trees or plants after they have been set in the furrow by the mechanism connected with the walking-wheel, and they also serve as a support for the rear end of the machine, as will be readily understood.

It will be observed that the cutter-wheel, plows, landside, and walking-wheel and coverers are all connected directly to the inner frame of the machine, the plows being secured to said frame by means of the standards L $L^2$, which are bolted securely to the frame. The standard $L^2$ is extended above the frame, as shown, and its upper end is bent toward the rear of the machine and passed within an archway formed by the rod $L^6$, the ends of which are secured to the sides of the outer frame. This archway serves to steady the standard.

The inner frame with all of its attachments is made vertically adjustable in the following manner: M is a crank-shaft journaled in suitable uprights, $M^2$, secured to the inner frame at a point near its forward end, said crank-shaft being connected by means of a link, $M^3$, with a transverse shaft, $M^4$, journaled directly below the crank-shaft M within the uprights $M^5$, rising from the outer frame. It is at once evident that by this construction the inner frame with all of its attachments may be readily raised or lowered by means of the operating-lever N, pivoted at its lower end to the rear of the outer frame, and attached to the arm $M^6$ by means of a connecting-rod, $M^7$, and the frame is secured in its adjusted position by the engagement of a pawl secured to the operating-lever, with the notches of the rack-bar $M^8$ secured to the rear end of the frame.

O is a lever pivoted at its lower end to the opposite side of the outer frame at its rear end, and is connected by means of the rod $O^2$ with the extension $O^3$ at the upper end of the pivoted standard carrying the cutter-wheel C. It will be readily seen that by moving the lever the direction of the cutter-wheel may be regulated.

P P are boxes for storing the trees or plants to be set. These boxes are secured to the top of the outer frame, one upon either side, and they may be of any suitable or desired form of construction.

Q is the driver's seat, which is supported upon the spring-bars $Q^2$ at the rear end of the machine, and R R' are side seats for use by the operators.

The operation of the machine is simple, and from the foregoing description of the construction will be readily understood.

The boxes P having been filled with trees or plants, and the inner frame, with its cutter, plows, and other attachments, adjusted at the proper height, the machine is moved in the direction in which it is desired to plant the row of trees. The operators, occupying the seats R adjacent to the tree-boxes, remove the trees or plants from the boxes as they are needed and pass the same to the occupants of the adjacent seats, R', who in turn place the same within the open jaws of the fixed clamps L, the root end of the plant being placed outward, and the tree or plant is grasped by the next succeeding clamp, $G^3$, the jaws of which clamp are by the mechanism above described closed at this point, and the plant is carried by the revolution of the wheel to the furrow, where it is left in an upright position by the clamping-jaws, which are opened at this point in the revolution of the wheel by the cam mechanism described. As the machine continues to move forward, the clamping-jaw is held open in readiness to receive another plant upon its arriving at the top of the wheel, while the earth at the sides of the furrow is turned back into the furrow and against the sides of the plant by the shovels J, and the earth is further pressed securely about the plant by the passage of the inclined wheels K, which pass upon each side of the planted row, the driver's seat being placed at a sufficient height to allow the machine to pass without injury to the trees or plants.

In order to provide against the possible displacement of the plant by the slight rearward motion that would otherwise be imparted to the leg of the wheel carrying the clamp at the moment at which the plant is released by the clamp, I provide the spiral springs S, one end of which is secured to the front edge of the clamp, and the opposite end is secured to the outer rim of the wheel, and the slight rearward movement imparted to the leg upon leaving the ground, being against the tension of this spring, is in a very great measure overcome.

While I have described the legs of the walking-wheel as pivoted to the spokes of the wheel and provided with spring-actuated clamps, I do not wish to limit myself to such exact construction, as it is at once evident that the legs could be made integral with the wheel, and any of the various forms of clamping devices adapted to such use might be substituted for the spring-actuated clamp which I have described without departing from the spirit of my invention.

Having thus described my invention and set forth its merits, what I claim to be new, and desire to secure by Letters Patent, is—

1. The combination, with the walking-wheel provided with legs extended beyond the rim of said wheel, of the springs acting on said legs, substantially as described.

2. The combination, with the walking-wheel and its clamps, of stationary clamps in the path of the clamps on the wheel, substantially as and for the purpose described.

3. The combination, with the walking-wheel and the automatically-operating clamps carried thereby, of the stationary clamps in the path of the clamps on the wheel, substantially as described.

4. The combination, with the walking-wheel and its clamps, of the archway over said wheel, and a clamp on said archway, substantially as described.

5. The combination, with the walking-wheel, of clamps arranged alternately upon opposite sides of said wheel, the archway over said wheel, and the stationary clamps upon opposite sides of said archway, substantially as and for the purpose specified.

6. The combination, with the frame and the walking-wheel, of the plow, the subsoiler to the rear of the plow, and a coverer to the rear thereof, substantially as and for the purpose specified.

7. The combination, with the frame, the walking-wheel, and the plow, of the subsoiler to the rear of the plow, substantially as and for the purpose specified.

8. The combination, with the frame and the walking-wheel, of the cutter, the plow to the rear of the cutter, and the subsoiler in the rear of the plow, substantially as described.

9. The combination, with the walking-wheel and the frame, of the cutter, the plow, the subsoiler to the rear of the plow, and the coverer to the rear of the subsoiler, substantially as described.

10. The combination, with the frame and the walking-wheel, of the plow and the subsoiler arranged in different horizontal planes, substantially as and for the purpose specified.

11. The combination, with the walking-wheel and the frame, of the rotary cutter, the plow, and the subsoiler, all upon different horizontal planes, substantially as shown and described.

12. The combination, with the frame and walking-wheel, of the cutter, plow, and subsoiler, and provisions for adjusting them simultaneously, substantially as described.

13. The combination, with the stationary frame, of the movable frame and the plow, subsoiler, and walking-wheel carried by said movable frame, substantially as described.

14. The combination, with the stationary frame, of the movable frame, the rotary cutter, the plow, the subsoiler, the walking-wheel, and the coverers, all carried by said movable frame, substantially as described.

15. The combination, with the stationary frame and the movable frame and its accessories, of the lever N, the crank-shaft M, the links $M^5 M^6$, and the rod $M^7$, substantially as described.

In testimony whereof I affix my signature in presence of two witnesses.

THOMAS A. STRATTON.

Witnesses:
W. E. CHURCHILL,
ALBA BROWN.